Aug. 24, 1937.  O. J. THOMPSON ET AL  2,091,058
BALL VALVE
Filed Feb. 3, 1934   2 Sheets-Sheet 1

Inventors
HENRY W. FELT
and O. J. THOMPSON
By Mason Fenwick & Lawrence
Attorneys Aug. 24, 1937. O. J. THOMPSON ET AL 2,091,058
BALL VALVE
Filed Feb. 3, 1934 2 Sheets-Sheet 2

Inventors
HENRY W. FELT
and O. J. THOMPSON
By Mason Fenwick&Lawrence
Attorneys

Patented Aug. 24, 1937

2,091,058

UNITED STATES PATENT OFFICE 2,091,058

BALL VALVE

Orville J. Thompson, Franklin, Pa., and Henry W. Felt, Oil City, La.; said Thompson assignor to Charles N. Hough Manufacturing Company, a corporation of Pennsylvania Application February 3, 1934, Serial No. 709,618

13 Claims. (Cl. 251—121)

This invention relates to improvements in ball check valves, and more particularly to valves used in oil pumping operations under conditions where very high pressures are involved.

When displacing liquid from a working barrel or pump cylinder in oil pumping apparatus, the valve in the lower end of the cylinder, commonly known as the lower or standing valve, is closed, while in the upper end of the cylinder the valve which travels, commonly known as the upper or working valve, is open to permit the escape of liquid in this type of pump. The lower or standing valve is open on the upstroke, and the upper travelling valve is closed. The present invention, comprising a ball socket guide enclosing a ball which seats on a valve seat, is adapted for use in either the upper or lower valve.

In the use of ball valves in oil pumps, it frequently happens that the wings of the valve cage or crown become battered and worn due to side play against the bars of the cage and the chamfer of the seat. The life of the valve seat is shortened because the ball does not always seat squarely on the valve seat. These side movements and irregular seating cause the chamfer in the valve seat to be destroyed and the balls are frequently damaged by nicking and battering due to their contact with the sharp corners of the valve seat chamfer. This nicking of the ball and hammering of the valve seats bring about a leaky condition which permits passage of liquid between the ball and seat, even when the ball is positioned on its seat, and cuts out the seat and necessitates replacement of both ball and valve seat.

The main object of the present invention is to provide a ball valve with a socket guide and seat so designed and arranged as to overcome the objections in prior ball valves just referred to.

The invention itself comprises a valve cage or crown having a ball valve seat detachably mounted in its lower end with a ball enclosed in a sliding socket, or ball guide, mounted to slide with snug sliding fit between the bars of the cage to eliminate the side to side movement of the ball toward the vertical bars of the cage. The valve seat is so arranged in the cage that the cylindrical sliding socket is coaxial with the axis of the valve seat so that the ball enclosed within the ball guide or socket always moves squarely into sealing contact with the chamfer of the valve seat. The positive seating of the ball at each movement directly toward its seat increases the rate of pumping, because the ball is thereby quickly and positively seated on each stroke of the valve or pump.

Other objects of the invention will become apparent as the detailed description thereof proceeds.

Figure 1:
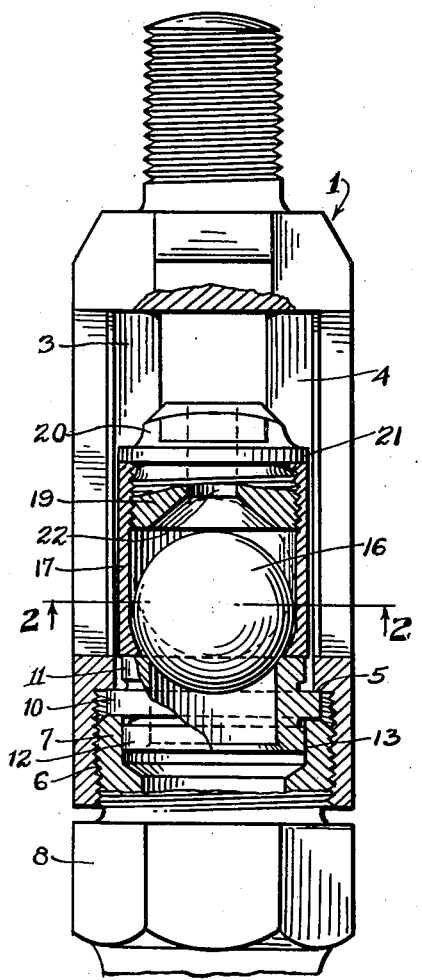
Figure 1 is a central vertical section through a valve cage, having a sliding socket ball guide mounted therein.
Figure 2:
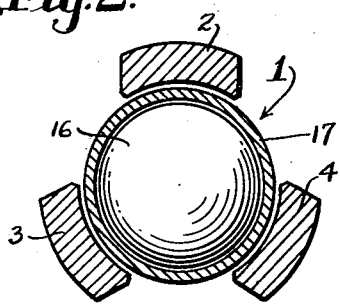
Figure 2 is a horizontal section taken on the line 2—2 of Figure 1.
Figure 3:
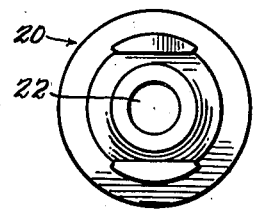
Figure 3 is a top plan view of a bonnet adapted to be connected to the upper end of the sliding socket ball guide.
Figure 4:
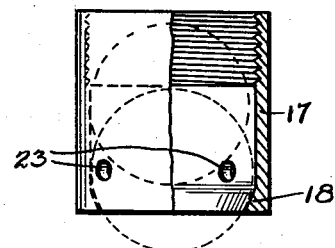
Figure 4 is a sectional elevation of the sliding socket ball guide.
Figure 5:
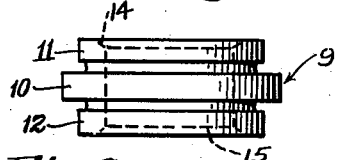
Figure 5 is a side elevation of a reversible valve seat forming part of this invention.
Figure 6:
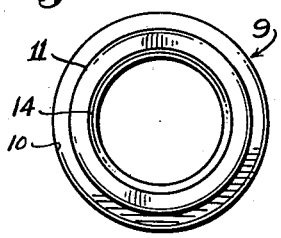
Figure 6 is a plan view of the valve seat shown in Figure 5.
Figure 7:
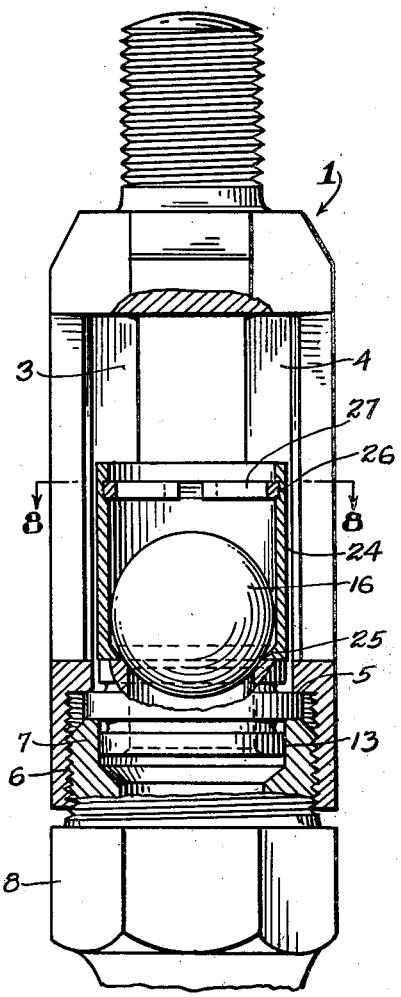
Figure 7 is a central vertical section through a modification of the invention.
Figure 9:
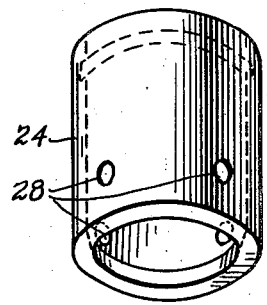
Figure 9 is a perspective of the socket ball guide illustrated in Figures 7 and 8.

As shown in the drawings, the invention comprises a valve cage or crown 1 of standard construction having the usual cage bars, 2, 3, and 4, spaced apart around the periphery of the cage. The lower end of the valve cage 1 is recessed to form an annular shoulder 5 adapted to form a clamping stop for the valve seat, to be described hereafter.

The cylindrical wall 6 of the recess in the bottom of the valve cage 1 is internally screwthreaded to receive the external screwthreads formed on the cylindrical extension 7 of the upper end of the valve body 8. The valve seat 9 comprises a cylindrical part having a central flange 10 projecting outwardly from the members 11 and 12, each of which is of the same diameter, and each of which is adapted to fit with pressed fit into the cylindrical recess 13 formed in the cylindrical extension 7 coaxial therewith.

As shown in Figure 1, the flange 10 of the valve seat 9 is adapted to be clamped between the upper end of the cylindrical extension 7 on the valve body 8 and the shoulder 5 formed at the bottom of the recess 6 of the valve cage 1. The opposite ends of the valve seat 9 are provided with chamfers 14 and 15 ground to fit the surface of a ball 16. The ball 16 is mounted to slide snugly within the cylindrical sliding socket 17. The lower end of this socket 17 is made narrower than the remaining part of the cylinder to provide a beveled annular shoulder 18, the smallest diameter of which is substantially the same as the largest diameter of the chamfer 14 of the valve seat 9.

The upper end of the sliding socket 17 is internally screwthreaded to receive the external screwthreads of the cylindrical extension 19 of a bonnet 20 having a flange 21 adapted to seat on the upper end of the sliding socket 17 to limit the movement of the bonnet 20 into the socket. A hole 22 is drilled through the center of the bonnet to provide for wash of liquid and to wash out any possible accumulation of sediment. Several holes 23 are drilled through the sliding socket 17 to provide for wash of liquid and prevent accumulation of sediment which might cause the ball 16 to stick or bind.

It will be evident from the disclosure herein, that the several parts of the valve can be very quickly assembled and secured to the valve body 8. The valve seat is reversible; and the sliding socket, with its shouldered lower end, holds the ball securely during the assembly of the several parts on the extension of the valve body. The sliding socket eliminates all possibility of the ball hammering against the bars of the cage; and guides the ball constantly so that its center always lies on the axis of the valve seat.

In the forms of the invention shown in Figures 7 to 11, the valve cage 1 remains the same as illustrated in Figure 1 of the drawings. The modification illustrated in Figures 7, 8, and 9 includes a ball socket guide 24 having a shoulder 25 formed at the lower end thereof to serve as a stop for the ball 16. The inner surface of the socket 24, near its upper end, is provided with a groove 26 adapted to receive a split ring 27 forming a stop for the ball at the other end of the socket 24. The socket 24 is provided with a series of apertures 28, near the lower end thereof, to provide for wash of liquid and prevent accumulation of sediment.

Figure 10:
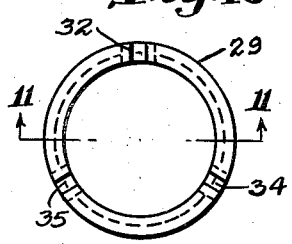
Figure 10 is a top plan of another modification of the socket ball guide.
Figure 11:
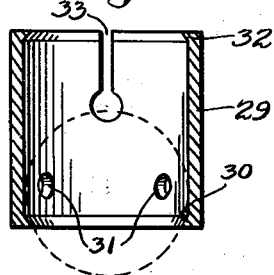
Figure 11 is a vertical section taken on the line 11—11 of Figure 10.
Figure 8:
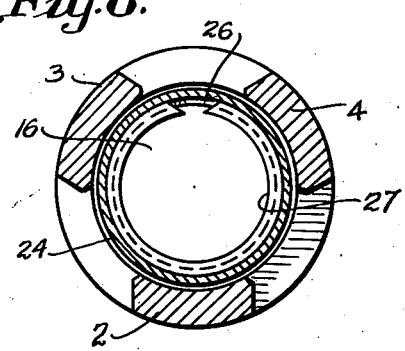
Figure 8 is a horizontal section taken on the line 8—8 of Figure 7.

In Figures 10 and 11, there is illustrated another modification of the ball socket guide. This modification comprises a cylindrical socket 29 provided with the usual shoulder 30 at the lower end thereof and having apertures 31 drilled therethrough to provide for wash of liquid. The upper end of the socket 29 is provided with a shoulder 32 similar to the shoulder 30 at the lower end of the socket. To permit the introduction of the ball 16 into this form of the socket the latter is slotted lengthwise thereof for some distance from the top edge. Three of these slots 33, 34, and 35 are shown in the drawings. The socket in this form is made of springy material so that the slotted upper end of the socket can be spread apart to permit the entrance of the ball 16. After the ball has been pushed through the upper end into the socket, the slotted upper parts spring together again to assume their normal position.

It is thought that the invention and its attendant advantages will be understood from the foregoing description, and it is obvious that numerous changes may be made in the form, construction and arrangement of the several parts without departing from the spirit or scope of our invention, or sacrificing any of its attendant advantages; the form herein described being a preferred embodiment for the purpose of illustrating our invention.

What we claim is:

1. A pump fitting comprising: a valve body, a valve cage detachably connected thereto, a valve seat detachably clamped between said cage and body, a cylindrical socket slidable freely in said cage, said cage, seat and socket having a common axis, a ball slidable axially in said socket and having its diameter substantially equal to the internal diameter of said socket and stops in said socket to retain the ball therein.

2. A pump fitting comprising: a valve body, a valve cage detachably connected thereto, a valve seat detachably clamped between said cage and body, a cylindrical socket slidable freely in said cage, a ball slidable axially in said socket and having its diameter equal to the internal diameter of the socket, said cage, seat and socket having a common axis, said socket having an inturned shoulder at one end thereof to form a stop for said ball, and a stop for said ball in the other end of said socket.

3. A pump fitting comprising: a valve body, a valve cage detachably connected thereto, a valve seat detachably clamped between said cage and body, a cylindrical socket slidable in said cage and having an inturned shoulder at one end thereof, a ball slidable axially in said socket and having its diameter equal to the internal diameter of the socket; said cage, seat and socket having a common axis, and a bonnet detachably secured to the other end of said socket, said shoulder and bonnet forming stops to retain the ball in said socket.

4. A pump fitting comprising: a valve body, a cylindrical extension extending from said body coaxial therewith, a valve cage having one end recessed and detachably secured to said extension, a valve seat coaxial with said extension and clamped in said recess against said extension, a ball for said seat, means slidable freely in said cage for guiding the ball toward and from said seat with its center lying constantly in the axis of said seat and means to prevent separation of said ball from said guiding means.

5. A pump fitting comprising: a valve body, a cylindrical extension extending from said body coaxial therewith, a valve cage having one end recessed and detachably secured to said extension, a valve seat coaxial with said extension and clamped in said recess against said extension, a cylindrical socket slidable in the cage coaxial with said seat and having a shoulder extending inwardly from the end adjacent said seat and adapted to register therewith, a ball slidable axially in said socket toward and from said shoulder, and a detachable bonnet at the other end of said socket to limit the sliding movements of the ball therein.

6. A pump fitting comprising: a valve body, a cylindrical extension extending from said body coaxial therewith, a valve cage having one end recessed and detachably secured to said extension, a valve seat coaxial with said extension and clamped in said recess against said extension, a cylindrical socket slidable in the cage coaxial with said seat and having a shoulder extending inwardly from the end adjacent said seat, and adapted to register therewith, a ball slidable axially in said socket toward and from said shoulder and a stop for said ball at the other end of said socket.

7. A pump fitting comprising: a valve body, a cylindrical extension extending from said body coaxial therewith, a valve cage having one end recessed and detachably secured to said extension, a valve seat coaxial with said extension and clamped in said recess against said extension, a cylindrical socket slidable in the cage coaxial with said seat and having a shoulder extending inwardly from the end adjacent said seat, and adapted to register therewith, a ball slidable in said socket toward and from said shoulder, and a bonnet at the other end of said socket to limit the sliding movements of the ball therein, the bonnent being axially apertured to provide for wash of liquid and prevent accumulation of sediment.

8. A pump fitting comprising: a valve body; a cylindrical extension extending from said body coaxial therewith; a valve cage having one end recessed and detachably secured to said extension; a valve seat coaxial with said extension and clamped in said recess against said extension; a cylindrical socket slidable in the cage coaxial with said seat and having a shoulder extending inwardly from the end adjacent said seat, and adapted to register therewith, and a ball slidable in said socket toward and from said shoulder, and a bonnet at the other end of said socket to limit the sliding movements of the ball therein, the bonnet being axially bored and the socket radially bored to provide for wash of liquid and prevent accumulation of sediment.

9. A pump fitting comprising: a cage having a valve seat at one end, a ball valve, means slidable freely in the cage for controlling and guiding the ball toward and from the seat with its center always in the axis of the seat, and means to prevent separation of the ball from said guiding means.

10. A pump fitting comprising: a cage having a valve seat, a cylindrical socket slidable in said cage toward and from said seat, a ball slidable axially in said socket and adapted to close said seat, and means at the opposite ends of said socket to retain the ball therein.

11. A pump fitting comprising: a cage having a valve seat, a cylindrical socket slidable in said cage toward and from said seat, a ball slidable in said socket and adapted to close said seat, said socket having a shoulder projecting inwardly from one end thereof and having a groove around its inner periphery near its other end, and a split ring seated in said groove, said ring and shoulder limiting the axial movements of the ball in said socket.

12. A pump fitting comprising: a cage having a valve seat, a socket slidable in said cage toward and from said seat and having stops spaced apart axially therein, and a ball slidable in said socket between said stops.

13. A pump fitting comprising: a cage having a valve seat, a socket slidable in said cage toward and from said seat, said socket having inwardly directed shoulders at opposite ends thereof and being slotted lengthwise through one of said ends to permit spreading thereof, and a ball slidable in said socket between said shoulders.

ORVILLE J. THOMPSON.
HENRY W. FELT.